Oct. 9, 1928.                                                          1,686,766
                         H. J. SAUVAGE
                   THERMOSTATIC CONTROL SYSTEM
                       Filed Jan. 11, 1927
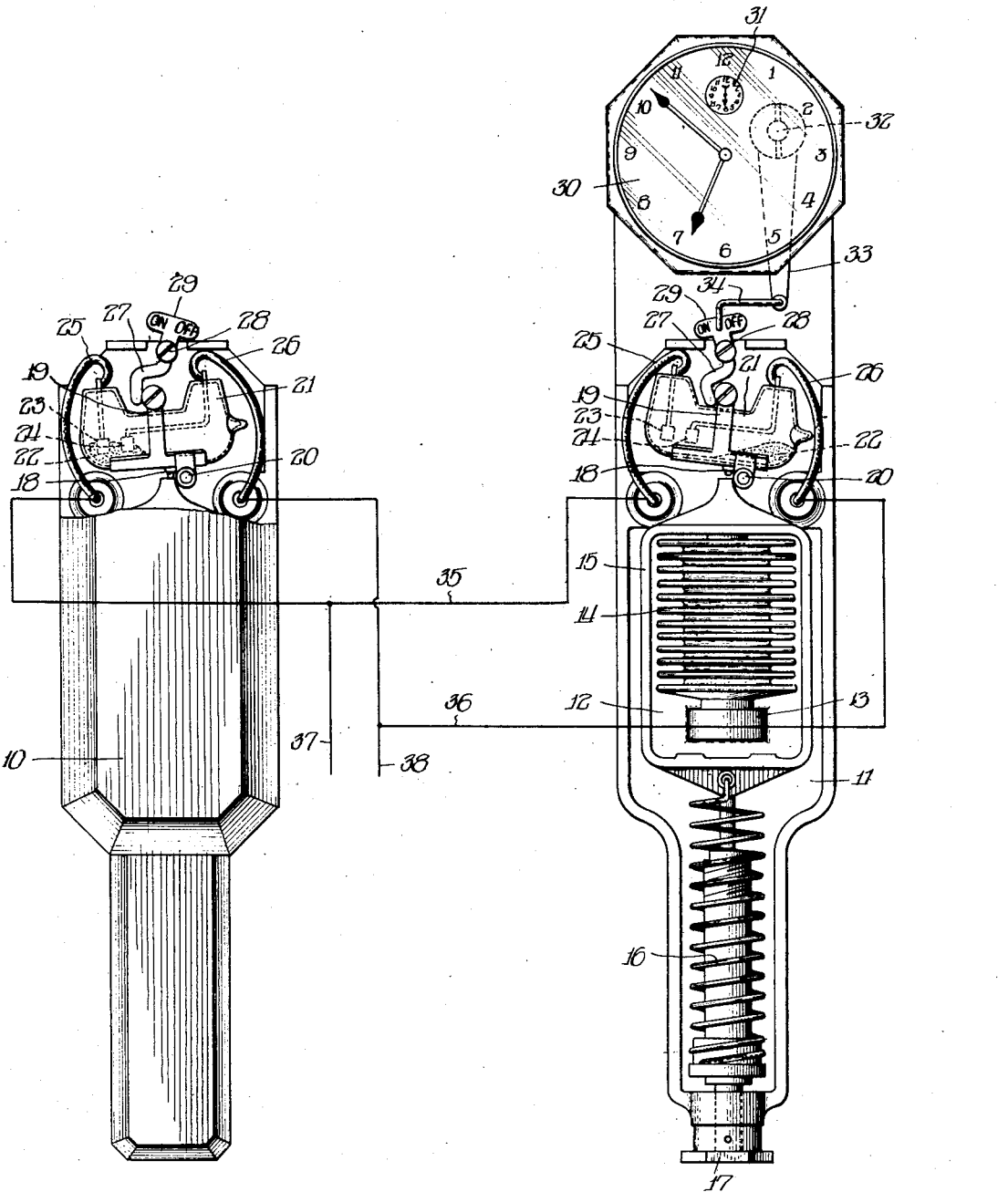
Witness:
R. Burkhardt
Inventor:
Herbert J. Sauvage
By Walter M. Fuller  Atty Patented Oct. 9, 1928.

1,686,766

UNITED STATES PATENT OFFICE.

HERBERT J. SAUVAGE, OF CHICAGO, ILLINOIS, ASSIGNOR TO TRUSTEES OF THE ELECTRO THERMOSTATIC CONTROL COMPANY, OF CHICAGO, ILLINOIS, A TRUST ESTATE.

THERMOSTATIC CONTROL SYSTEM.

Application filed January 11, 1927. Serial No. 160,386.

My present invention pertains to thermostatic means for controlling an electric circuit and thereby governing the action of an electric mechanism incorporated in or forming part of such circuit.

It is frequently desirable to regulate an appliance by means of two thermostats, one controlling the action of the device during a portion of the time, the other governing its operation during the remainder of the time.

For example, it may be required to regulate the functioning of heating means by a thermostat in one room during the daytime, and to control its operation by a different thermostat located in another room during the night-time.

Under such circumstances, it is commonly desirable to shift automatically from the one thermostat to the other during the early morning, the active one being rendered inoperative, manually or otherwise, in the evening, and remaining in that condition until again made operative by an automatic means, such, for instance, as a clock.

To enable those skilled in this art to have a complete understanding of the manner in which these and other objects and aims are accomplished by the employments of the present invention, I have illustrated a preferred embodiment of the same in the accompanying drawing, the single view of which shows the system somewhat diagrammatically.

The novel and improved system and apparatus employs two like thermostatic appliances, characterized as a whole 10 and 11, each being of the general construction set forth in my co-pending patent application for "thermostatic appliances", Serial No. 724,278, filed July 5, 1924, the structure of each being briefly described as comprising a back-plate or support 12 having a forwardly-projecting ledge 13 on which an expansible and contractible bellows-type of thermostat 14 is mounted, the upper or movable end of such accordion-like element bearing on the top cross member of a frame or yoke 15 pulled down by a coil contractile spring 16, the tension or strain on which may be readily adjusted by turning the thumb-piece 17 to which the lower end of the spring is connected, the adjustment of the spring by the simple means indicated regulating the temperature at which the thermostat will open or close the companion electric-switch about to be described.

This frame or yoke 15 bears on a small downward projection or lug 18 on a sheet-metal saddle 19 fulcrumed at 20 on the back or supporting plate 12, such part 19 carrying a hollow glass vessel 21 containing a small quantity of mercury 22 adapted to make and break connection with two switch-contacts 23 and 24, suitably supported in spaced relation in the glass member and directly connected to the two switch terminals or leads 25 and 26.

When the yoke 15 is in a lowered position, which is permitted by the thermostat when a reduced temperature prevails (as shown, for instance, in connection with the thermostat 10), then the hinged or rockingly-mounted glass-body tilts to cause the mercury to bridge the gap between the pair of switch-contacts, and completes the electrical connection between the two complementary leads 25 and 26.

When a sufficiently high temperature occurs, the yoke, raised by the expansion or elongation of the thermostatic element, rocks the glass switch-member to the right, causing the mercury to flow away from and to break the connection between the switch-contacts, as shown in the drawing, in the thermostatic apparatus characterized 11.

Each such oscillatory switch-member normally tends to rock down and close the switch by reason of its unbalanced mounting, and it will do this as soon as the thermostat proper contracts sufficiently to permit this occurrence.

Each thermostatic apparatus 10 and 11 is equipped at its top with a bent rock-arm or short lever 27, the lower end of which coacts with the corresponding strap or saddle 19, and the fulcrum 28 of which has adequate friction or pressure so as to maintain the arm in any position it may be set, so far as the weight of the oscillatory switch-member is concerned, whereby such arm may be used manually to turn the switch into "off" position and to hold it there until the arm is moved by other means.

In order to indicate the position of the arm and the condition of the associated switch, the former has a top part 29 displaying two legends, "On" and "Off".

When this arm or lever of either thermostatic apparatus is in "on" position, the device will function to open and close the electric switch under small ranges of temperature changes, but if the arm of either appliance is moved to its "off" position, the switch will be maintained open under all conditions, because of the friction specified, and the corresponding thermostat will have no effect on it.

The one thermostatic apparatus 11 is supplied with an alarm-clock 30, from which the alarm-bell may be removed, if desired, the clock possessing the usual alarm-dial and adjustable pointer or finger 31 by means of which the time of the release of its wound-up alarm mechanism is effected.

The winding shaft 32 of such alarm mechanism is equipped with an arm 33 connected to the lever 27 by a suitable link 34, the spring of the alarm device being partially wound up before the connection with the lever 27 is completed.

When the lever 27 is shifted manually to "off" position, the alarm-spring will be wound up still further, because of the specified mechanical connection therewith and the electric switch will be held in inoperative position until the alarm mechanism is released as determined by the setting of the pointer 31, such discharge or release of the alarm-spring turning shaft 32 and its arm 33 in the direction to rock arm 27 away from the switch, thus freeing the latter and permitting it thereafter to respond to the action of its thermostat.

The electric switches of the two thermostatic devices, by means of the wires 35 and 36, are connected in parallel relation in the electric circuit 37, 38, in which is connected the electrical apparatus (not shown), to be governed by the two temperature-controlled appliances.

Such regulated apparatus may govern the feeding of fuel to a furnace, the opening and closing of drafts or dampers, the admission of steam, or any other appropriate function.

Ordinarily, but not necessarily, the two thermostats are adjusted to different temperatures, for example, the one 11 at 70° and one 10 at 50°.

During the daytime, or any other period, both thermostatic appliances are free to act, but inasmuch as the one designated 11 is set for the higher temperature, it will perform the entire controlling function and open and close its circuit automatically to maintain the required temperature, the range of the latter being only slight, possibly a fraction of a degree, or at most only a few degrees.

Under these circumstances, the thermostatic apparatus 10 effects no regulating function, because the temperature does not go low enough to permit it to close its part of the circuit.

When night-time arrives, or any other proper time, when it is desired to permit the other thermostatic appliance to do the regulating operation at a lower temperature, the lever 27 of the device 11 is moved to "off" position, thereby opening that switch and winding up the alarm-spring somewhat.

From then on the appliance 10 performs the controlling action at the lower temperature, its mate 11 during that period being inoperative for the reason stated.

At the arrival of the time indicated by the alarm dial and pointer 31, the alarm-spring is automatically released by the clock mechanism in the usual way, and the turning of the shaft 32 and arm 33 moves the lever 27 automatically to "on" position, rendering the previously-inoperative switch now active to carry on the controlling function at the higher temperature, which it will continue to do until the lever 27 is again moved to "off" position.

It will be perceived that the alarm-spring is wound up each time just the same amount that it unwinds to perform its work, so that it is never necessary to wind up the alarm-spring otherwise than as indicated during each setting of the lever 27.

Those trained in this art will readily understand that this invention is not limited and restricted to the precise and exact features illustrated and described, and that these may be modified within relatively wide limits without departure from the heart and essence of the invention as defined by the appended claim, and without the sacrifice of any of its material benefits and advantages.

I claim:

The combination of an electric switch, a thermostat to open and close said switch, means to hold said switch against response to the action of said thermostat, a clock having an adjustable spring-actuated alarm mechanism, and means connecting said alarm mechanism to said holding means, whereby when the latter is actuated to maintain the switch against response to the action of the thermostat, said alarm-spring will be wound up, and when the alarm mechanism is released, said spring in unwinding will restore said switch to responsive action to said thermostat.

In witness whereof I have hereunto set my hand.

HERBERT J. SAUVAGE.